(12) United States Patent
Adams et al.

(10) Patent No.: US 6,421,578 B1
(45) Date of Patent: Jul. 16, 2002

(54) STIR-FRICTION HOT WORKING CONTROL SYSTEM

(75) Inventors: Glynn Paul Adams, Slidell; Zachary Sean Samuel Loftus, New Orleans, both of LA (US); Joseph Nathan McCormac, Huntsville; Richard Allen Venable, Grant, both of AL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/249,680

(22) Filed: Feb. 12, 1999

(51) Int. Cl.[7] .......................... G06F 19/00; B23K 20/12
(52) U.S. Cl. ................... 700/212; 700/147; 228/112.1
(58) Field of Search ............................... 700/147, 170, 700/195, 212; 219/602, 617; 228/112.1; 29/402.07

(56) References Cited

U.S. PATENT DOCUMENTS 6,050,475 A * 4/2000 Kinton et al. ............ 228/112.1
6,139,400 A * 10/2000 Sato et al. .................... 451/10

* cited by examiner

Primary Examiner—Leo P. Picard
Assistant Examiner—Elliot Frank
(74) Attorney, Agent, or Firm—Duane Morris LLP (57) ABSTRACT

A stir-friction hot-working or welding arrangement uses a pin tool having a ligament 22 and a shoulder 224. The force required for incremental penetration increases markedly when the shoulder is reached. A control system for maintaining a set penetration depth includes a load cell for measuring force or pressure applied to the pin tool. The control system compares a reference signal representing the desired force with the actual force from the load cell, to produce an error signal which controls the penetration force, thereby tending to maintain a desired penetration depth. In a particular embodiment, the reference signal ramps up from a low or zero value at turn-on, to reduce forces applied upon initial penetration. In another embodiment, position signals are used to control a modulator or multiplier, which changes the error signal applied at certain positions of penetration, or at certain velocities of penetration.

4 Claims, 6 Drawing Sheets

STIR-FRICTION HOT WORKING CONTROL SYSTEM

FIELD OF THE INVENTION

This invention relates to control arrangements for stir-friction welders, and more particularly to automatic positioning systems for stir-friction welders.

BACKGROUND OF THE INVENTION

Figure 1:
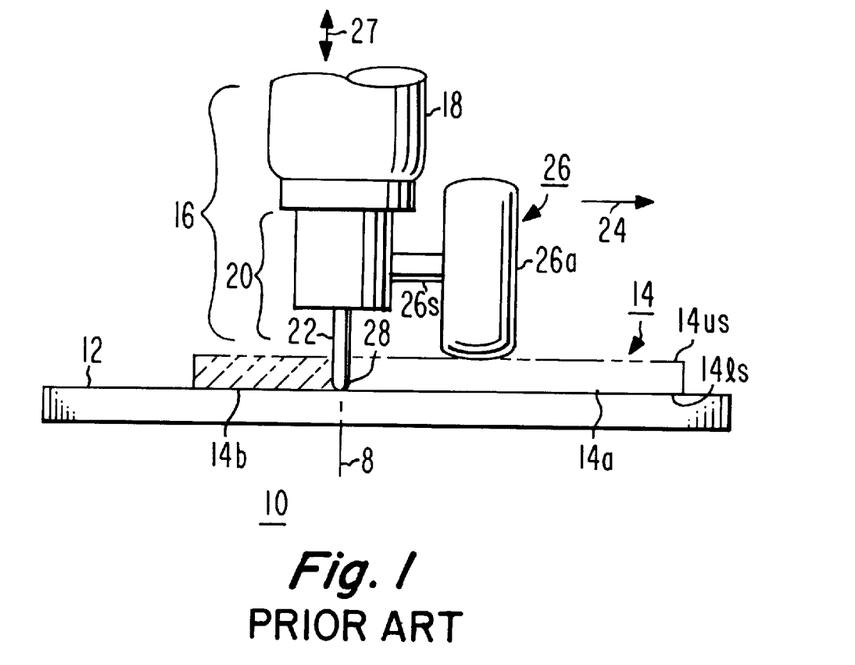
FIG. 1 is a simplified diagram illustrating a prior-art stir-friction technique using rollers to properly locate the rotating pin tool within the workpiece.

FIG. 1 is a simplified illustration of a prior-art stir-friction welding arrangement 10. In FIG. 1, an anvil 12 supports a flat workpiece 14, illustrated in phantom to make other portions of the arrangement more obvious. A friction-stir pin tool and spindle arrangement designated generally as 16 includes a spindle 18 which rotates about its axis 8, carrying with it a pin tool or ligament holding arrangement 20. The pin tool itself includes an elongated pin or ligament 22, which also rotates in consonance with the rotating spindle 18. As the spindle 18, holder 20, and pin tool 22 rotate, a relative motion is introduced between the anvil 12 (carrying the workpiece 14) and the spindle-and-pin-tool arrangement 16. The motion is represented by an arrow 24, which suggests movement of the spindle-and-pin-tool to the right in FIG. 1, assuming that the anvil 12 and workpiece 14 remain fixed. As a consequence of the friction resulting from the rotation of the pin tool 22 within the workpiece 14, that portion of the workpiece near the pin tool 22 is heated and becomes plastic. The relative motion represented by arrow 24 indicates that the portion 14a of workpiece 14, which lies to the right of pin tool 22 in FIG. 1, has not yet been welded or hot worked, while that portion 14b of workpiece 14, which lies to the left of the pin tool 22, has already been hot-worked, as suggested by the dashed hatching. Those skilled in the stir-friction hot working arts know that the described motion results in a line weld or hot working of the workpiece.

In order to make appropriate welds, the pin tool or ligament 22 of FIG. 1 must be maintained at a depth which provides full hot working of the desired region of the workpiece. The depth of plunge of the pin tool 22 is the depth to which the tip 28 of the pin tool 22 extends below the upper surface 14us, which is the surface from which the pin tool is introduced into the workpiece. The depth of plunge cannot be such that the tip 28 of pin tool 22 extends beyond the second or lower surface 14ls of the workpiece, because this might weld the workpiece 14 to the anvil 12, or might damage the workpiece or pin tool. In U.S. patent application Ser. No. 09/036,915, now U.S. Pat. No. 5,971,247, the position of the pin tool is maintained at the appropriate level by a set 26 of rollers, only one of which, namely roller 26a, is illustrated. Roller 26a is affixed by a shaft 26s to the spindle or tool holder, and rotates therewith, bearing on the upper surface 14us of the workpiece 14. The position of the tip 28 of the pin tool 22 in this prior-art arrangement extends below (or beyond) the lower rolling surface of the rollers by the desired penetration of the workpiece. The penetration of the workpiece may be termed "axial" penetration, because the penetration is in a direction coincident with, or at least parallel to, the axis of rotation 8 of the spindle 18 and the pin tool 22.

The roller arrangement 26 for controlling the depth of penetration of the pin tool during stir-friction welding or hot working is effective, but the roller apparatus makes it inconvenient to change the penetration depth from one workpiece to another, and it is not possible to make small adjustments in the depth of penetration during a weld or hot-working procedure.

Another prior-art method which can be used to control the depth of penetration of a stir-friction pin tool into a workpiece is by the use of distance measuring devices or sensors (not illustrated) which measure the distance between the upper surface of the workpiece, corresponding to surface 14us in FIG. 1, and a reference point on the spindle holding structure. Sensors which might be used in such a prior-art arrangement include laser systems and linear variable differential transformers (LVDTs). The sensor signal can be compared with a reference value representing the desired depth of penetration, and the spindle can be moved up or down, in the absence of rollers such as 26a, in the direction of double-headed arrow 27 of FIG. 1, in response to deviation of the measured position from the calculated position. This technique provides easy change of depth of penetration, by simply adjusting the signal representing the desired penetration, but is subject to error due to the large number of dimensions which must be added and subtracted in order to arrive at the calculated value, and because of axial position variation or changes due to slack in the spindle bearings, and similar tolerances.

Improved control arrangements are desired for stir friction welding.

SUMMARY OF THE INVENTION

A method according to the invention for stir-friction welding a planar workpiece uses a rotating pin tool which includes a pin or ligament. The pin or ligament defines a diameter at locations closer to the tip of the pin tool than at a particular location along its length. The pin or ligament also includes or defines a shoulder at the location. The shoulder has a larger diameter than the pin. The method includes the steps of rotating the tool, and applying force to the pin tool with the pin tool plunged into one side of the workpiece, and with the shoulder essentially coincident with the surface of the one side of the workpiece, so that the rotating pin creates a friction-stirred region. According to an aspect of a method according to the invention, the workpiece and the rotating tool are moved laterally (in a direction orthogonal to the axis of rotation) relative to each other, so that the friction-stirred region progresses along the workpiece. During the moving step, a signal is generated which is representative of the force applied to the pin tool. A reference signal is generated which is representative of that force which is sufficient to maintain the shoulder against the one surface of the workpiece. The signal representative of the force applied to the pin tool is compared with the reference signal, for generating an error signal representative of the difference between the force applied to the pin tool and the reference signal. The error signal is used to control the step of applying force in a manner tending to maintain the shoulder in contact with, or essentially coplanar with, the one surface of the workpiece, as a result of which, or whereby, the pin maintains substantially constant plunge depth.

In a particularly advantageous mode of practicing a method according to the invention, the step of applying force includes the steps of coupling a lead screw to the pin tool and to a fixed reference point, so that rotation of the lead screw applies pressure or force to the pin tool. The shaft of a force motor is coupled to the lead screw, for rotating the lead screw in response to rotation of the force motor, as a result of which, or whereby, the force applied to the pin tool is responsive to the rotational position of the shaft of the force motor. The shaft of the force motor is rotated in response to at least the magnitude of the error signal, and preferably in opposite rotational directions in response to the variation of the error signal relative to a particular value of the error signal, which is preferably a zero value. In a most preferred embodiment of the invention, the maximum force which can be applied to the pin tool is limited.

The method according to the invention may further include initial steps which cause the pin tool to plunge into the workpiece. These steps include positioning the tip of the pin tool adjacent the one surface of the workpiece, and generating a signal representing the plunge of the pin tool relative to the one surface of the workpiece. Other steps include generating a monotonically changing signal which represents a profile of the desired depth of plunge as a function of time, generating a difference signal representing the difference between the actual plunge of the pin tool and the desired depth of plunge, rotating the pin tool, and controlling the force in response to the difference signal in such a manner that the force increases when the actual plunge is less than the desired plunge, and decreases when the actual plunge is more than the desired plunge. The step of moving the workpiece and the rotating tool laterally relative to each other begins when the actual plunge equals the desired plunge.

BRIEF DESCRIPTION OF THE DRAWING

FIG. 5b is a plot of force or pressure for incremental penetration at a depth of penetration corresponding to the position along the tool of FIG. 5a;

DESCRIPTION OF THE INVENTION

Figure 2:
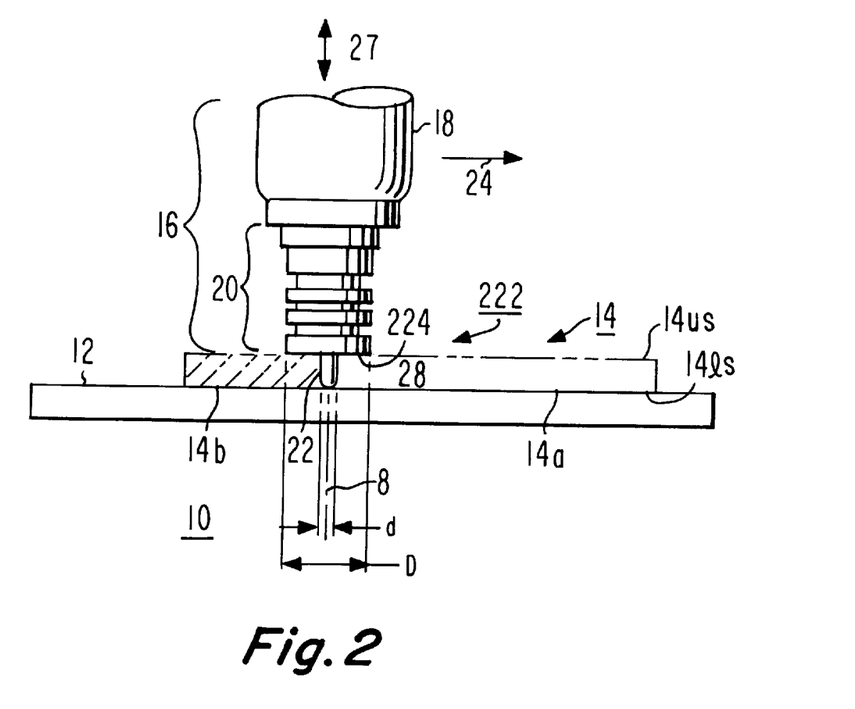
FIG. 2 is a simplified diagram similar to FIG. 1, illustrating a pin tool in accordance with the invention, which includes a shoulder designed to ride on the upper surface of the workpiece.

FIG. 2 is a simplified diagram, similar to FIG. 1, showing a pin tool 222 which includes a ligament 22 having a diameter d at locations away from the rounded tip, and also including a shoulder portion 224 having a larger diameter D than the diameter d of the ligament portion 22. As illustrated in FIG. 2, the shoulder portion 224 rides on the upper surface 14us of the workpiece 14 during operation, and the length of the ligament 22 in relation to the intended depth of hot-working or welding is selected to approximately equal the pin-tip-to-shoulder distance. Thus, the distance between the pin tip 28 and shoulder 224 in FIG. 2 is about equal to the depth of hot-working or welding.

Figure 3:
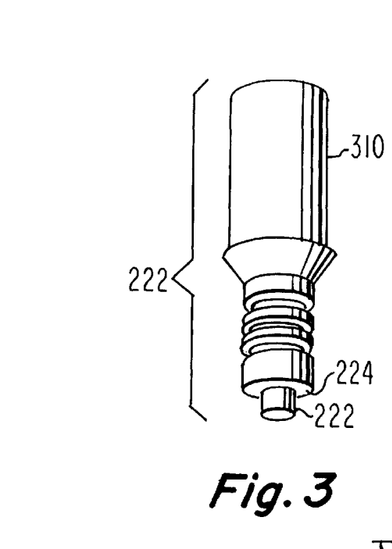
FIG. 3 is a perspective or isometric view of a tool with a shoulder, separately from the spindle.

FIG. 3 illustrates the pin tool 222 of FIG. 2 separate from the spindle 18. As illustrated in FIG. 3, the pin tool 222 includes a shank 310 in addition to the shoulder portion 224 and pin or ligament 22.

Figure 4:
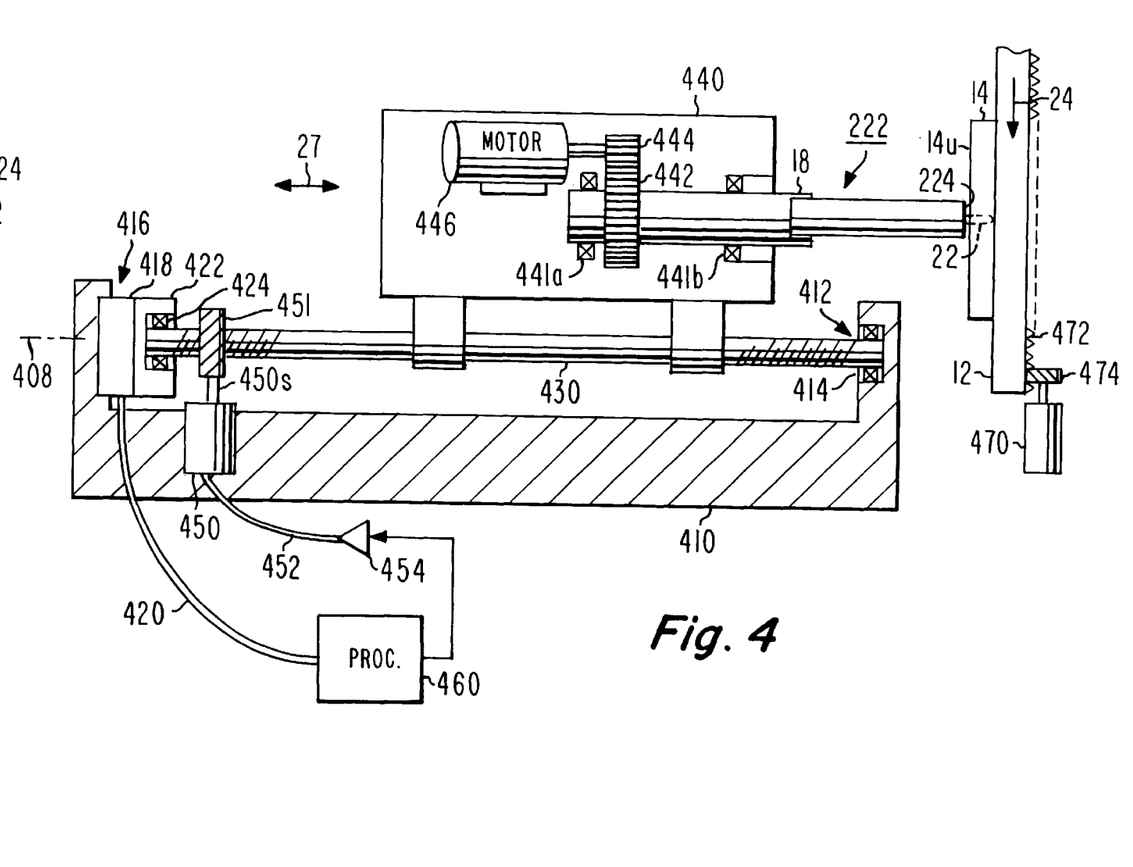
FIG. 4 is a simplified diagram illustrating how axial pressure may be applied to the pin tool according to one aspect of the invention.

FIG. 4 is a simplified diagram illustrating one method for applying force to the pin tool in accordance with an aspect of the invention. In FIG. 4, a fixed frame or housing 410 defines an aperture 412 for accommodating and supporting a first bearing 414, and also defines a second mounting region 416, to which a load cell 418 is mounted. Load cell 418 is a device which transduces force or pressure into electrical signals, which are available on a signal conductor set 420. Load cell 418 supports a bearing holder 422, which holds a bearing 424. A threaded shaft or lead screw 430 extends between bearings 414 and 424, and is rotatable about its axis 408. A first motor 450 is connected to a gear or worm 451 which engages lead screw 430, for, when the motor is energized, driving lead screw 430 to rotate around its axis 408. A mounting or head 440 is mounted in a movable fashion, and is mechanically coupled to the threads of lead screw 430 by a pair of threaded bosses or travelling nuts $440_1$ and $440_2$. Head 440 is controllably driven in the directions of arrow [46] 27 by rotation of lead screw 430. Thus, rotation of motor 450 in a first direction results in linear motion of head 440 in a first direction, and rotation of motor 450 in a second direction results in linear motion of head 440 in a second direction. Motor 450 is energized with electrical power transmitted over conductor set 452. A computer or processor (PROC) 460 produces appropriate control signals, which are amplified by a power amplifier illustrated as 454 before application by way of conductors 452 to motor 450. Processor 460 receives load-cell signals over conductor set 420, and processes the signals as described in more detail below, to control the position of head 440 and its pin tool 222.

It should be noted that pressure divided by area equals force, so they are not identical measures. However, with a constant-area system, force and pressure are proportional, and they are often used interchangeably.

Head 440 of FIG. 4 supports shaft or spindle 18 on a pair of bearings 441a and 441b. Spindle 18 is affixed to a circumferential gear 442. A spur gear 444 driven by a second or spindle motor 446 engages circumferential gear 442, and drives the spindle with a rotary motion in response to energization of motor. During operation of the apparatus of FIG. 4, spindle motor 446 is driven with a constant velocity, while lead-screw motor 450 is driven in response to signals from load cell 418.

As illustrated in FIG. 4, the workpiece 14 has its upper surface adjacent to shoulder 224 of the pin tool 222. Workpiece 14 is mounted on anvil 12, and anvil 12 has a rack gear 472 on its underside. Rack gear 472 is driven by a gear 474 which is, in turn, driven by a third or workpiece motion motor 470.

Figure 5A:
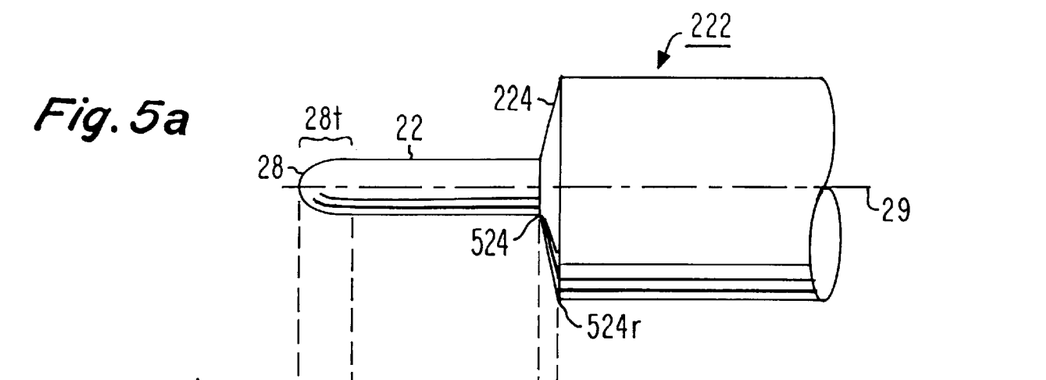
FIG. 5a is a side elevation view of a pin tool according to an aspect of the invention.
Figure 5B:
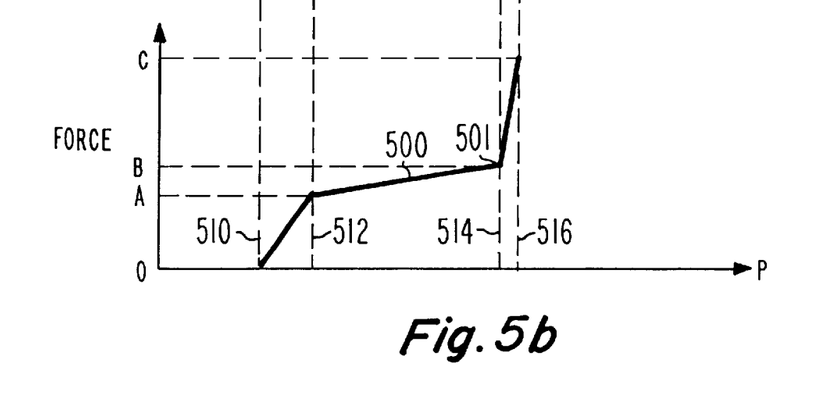

FIG. 5a illustrates details of the shoulder 224, and FIG. 5b illustrates as a plot 500 the relative force tending to resist the plunging of the rotating tool 222 into a workpiece, plotted against the position or plunge depth of the pin tool 22, As can be seen in FIG. 5a, the shoulder 224 is not absolutely flat, but is slightly cone-shaped or tapered, in such a manner that the outer edges of the shoulder 524r, as measured from the axis 29 of rotation, are slightly behind (more distant from) the inner or leading portion 524*l*, as measured from the tip 28. The plot 500 of FIG. 5*b* can be interpreted by noting that at the moment at which the tip 28 of pin tool 22 comes into contact with the workpiece, corresponding to position 510 of FIGS. 5*a* and 5*b*, the force is at or near zero. As the pin tool is plunged through the material of the workpiece so that the tapered tip portion 28*t* of the pin tool enters the material of the workpiece, the force represented by plot 500 increases, and eventually reaches a level A. The level A is reached as the plunge depth is such as to bring the upper surface of the workpiece to the position indicated as 512. Further plunging of the tool 222 into the workpiece, represented by those positions between position 512 and 514 of FIG. 5, cause a slight increase in the force necessary to produce further penetration, because a portion of the cylindrical portion of the pin tool lies within the workpiece, and its sides are in contact with workpiece, and tend to resist axial motion.

At some level of penetration, illustrated as level 514, the upper surface 14*u* of the workpiece begins to contact the leading edge 524*l* of shoulder 224, and the force required for further penetration increases sharply. The corner is designated 501, and the corresponding force is designated B. The maximum force C illustrated in plot 500 represents a condition in which the upper surface 14*u* of the workpiece 14 is even with outer portion 524*r* of the shoulder 224 at its maximum radius from the axis 29".

It should be understood that in the plot 500 of FIG. 5*b*, the actual pressure exerted on the underlying material of the workpiece may differ from the force illustrated, because in the range between penetrations 510 and 512, and between 514 and 516, the area of contact is increasing at a rate greater than the rate of increase of the force. Thus, the forces and the pressures may not track each other exactly in these plots.

Figure 6:
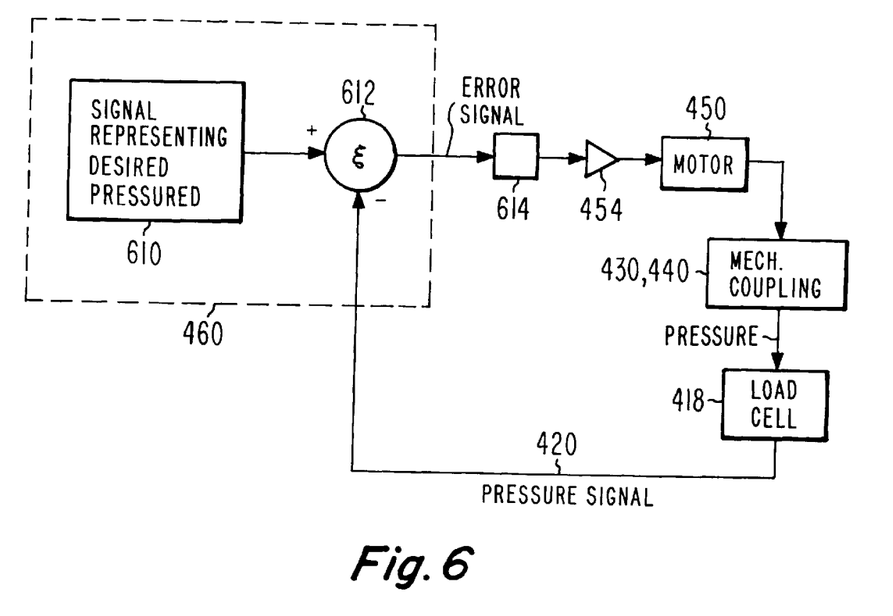
FIG. 6 is a simplified diagram of a feedback control loop according to an aspect of the invention, suitable for use in the arrangement of FIG. 4.

Considering the characteristics of plot 500 of FIG. 5*b*, it will be understood that the plotted forces tending to resist further penetration of the rotating pin tool increase in a monotonic manner with increasing penetration, although with different slopes for different penetrations. FIG. 6 is a simplified diagram of a feedback control arrangement, which may be implemented by processor 460 of FIG. 4, for control of lead-screw motor 450 in such a manner as to tend to maintain constant pressure or force on the pin tool 222. In FIG. 6, processor 460 includes a source of signal 610 which represents the desired pressure or force which is to be applied to the pin tool. The signal representing the desired pressure or force is applied to the noninverting (+) input port of a summing circuit 612. Summing circuit also receives at an inverting (−) input port a signal representing the actual force applied to the load cell 418. The force applied to the load cell 418 is the reaction force arising from the force applied by the lead screw 430 to the head 440 to drive the head, and the pin tool with it, toward the workpiece 14. Summing circuit 612 acts as an error signal generator, and subtracts the actual-pressure or actual-force signal from the desired-pressure or desired-force signal, to thereby produce an error signal. The error signal is applied to control the lead-screw motor 450 in a bidirectional manner. The motor is connected by way of mechanical elements, illustrated as a block 430, 440, to the load cell 418. The connections described in conjunction with FIG. 6, together with the mechanical arrangements discussed in conjunction with FIG. 4, make it clear to those skilled in the art that the system as so far described constitutes a degenerative feedback loop which tends to maintain the desired pressure or force on the pin tool. The pressure or force applied to the pin tool by the feedback arrangement can readily be changed by simply changing the reference signal produced by block 610.

The feedback arrangement as described in conjunction with FIGS. 4 and 6 tends to maintain the pressure or force on the spindle 18 and the pin tool 22 at a constant, selected target level. According to an aspect of the invention, the target pressure or force is selected to be that pressure or force represented by B of FIG. 5*b*, which corresponds to the corner 501, where there is a marked change from a relatively low rate of increase of force or pressure to a relatively high rate of increase as a function of penetration depth. This selection makes it easy for moderate pressures or forces (those lying between A and B of FIG. 5*b*) to cause penetration to depth 514, but any error in the feedback which gives a value of error signal greater than that required to reach depth 510 results in a relatively small additional penetration.

Figure 7:
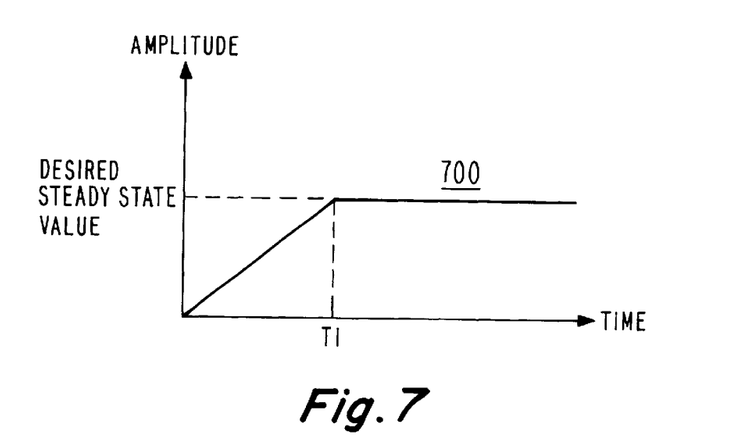
FIG. 7 is a plot of reference signal versus time for use in the arrangement of FIG. 6 according to an aspect of the invention.

Amend the paragraph extending from page 14 onto page 15 to read:

The arrangement of FIGS. 4 and 6 may tend to apply forces larger than desired to the pin tool at the beginning of penetration, before the pin tool has reached its full operating depth. According to an aspect of the invention, the reference signal source 610 of FIG. 6 produces a ramp voltage at initial start-up, which ramps from zero to the desired value, and then remains at the desired maximum value. FIG. 7 is a plot 700 of reference signal versus time according to this aspect of the invention. In plot 700, the amplitude of the error signal ramps from zero value at zero time to the desired steady-state value at a time t1, and remains at the steady-state value thereafter (or until a new plunge is undertaken).

Figure 8:
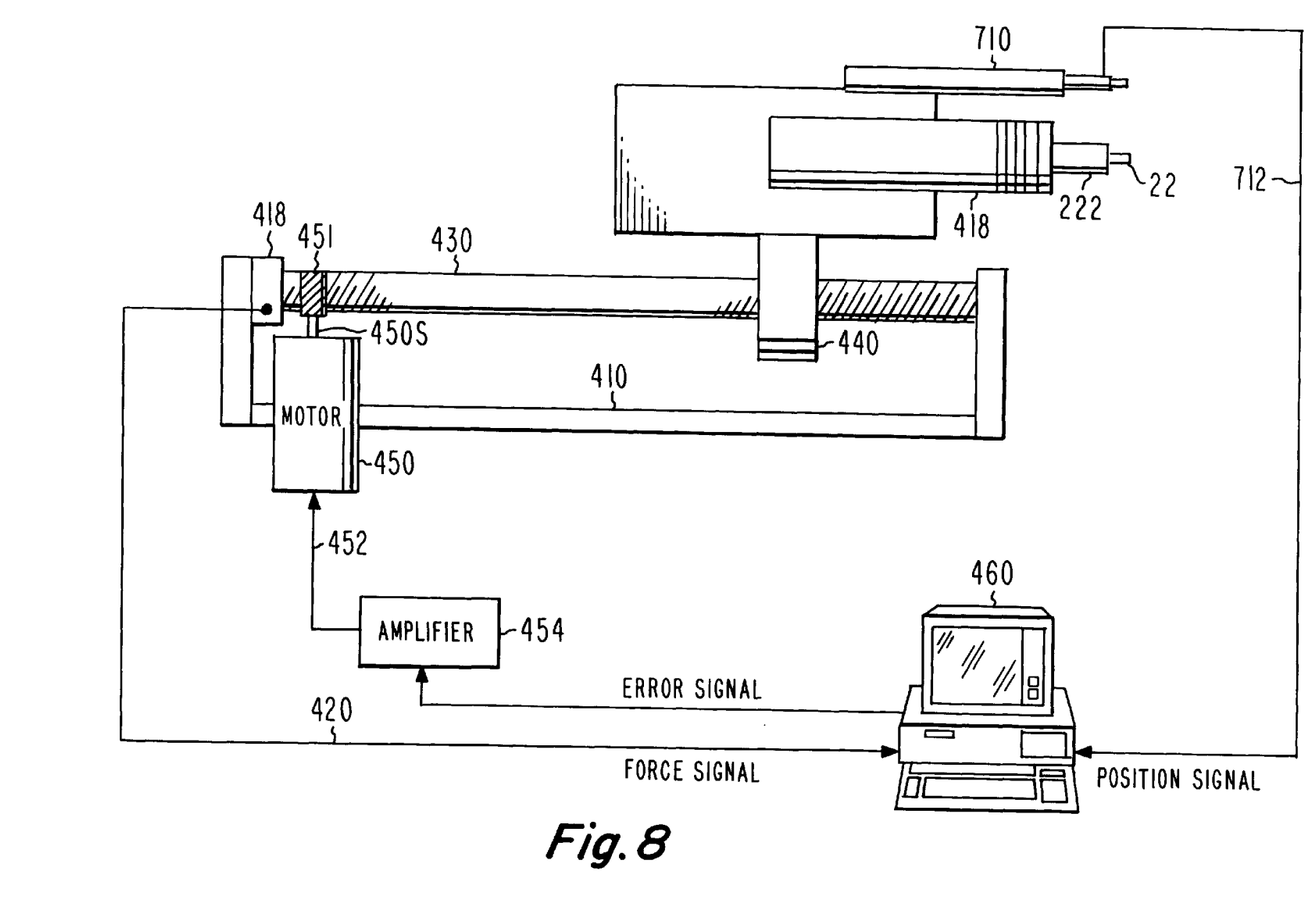
FIG. 8 is a simplified diagram similar to FIG. 4, including a distance measuring device.
Figure 9:
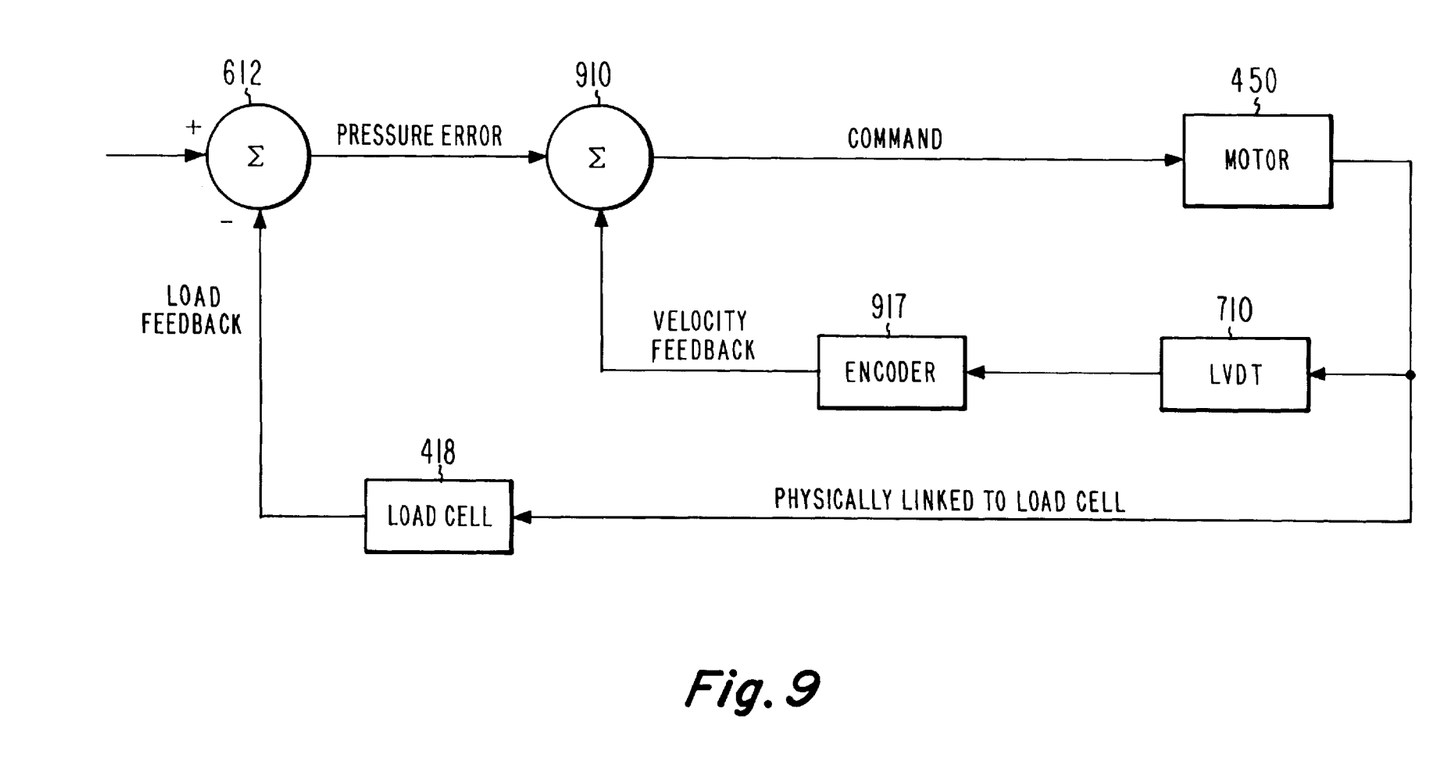
FIG. 9 is a simplified diagram of a feedback control system using the distance measurement to aid in generating the control signal.
Figure 10:
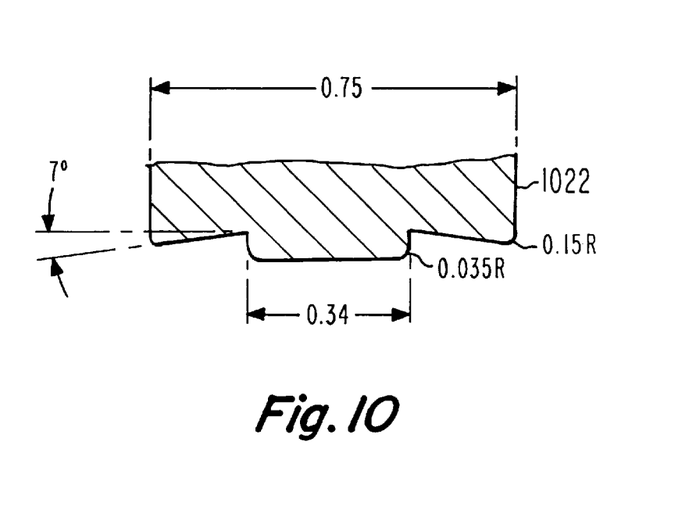
FIG. 10 is a dimensioned illustration of one embodiment of the pin tool 1022 in accordance with an aspect of the invention.

FIG. 8 is a simplified illustration of a stir friction hot-working or welding arrangement similar to that of FIG. 4, but including a measuring device or sensor in the form of a linear variable differential transformer (LVDT) 710, which produces signals on a signal path for application to the controller 460. FIG. 9 is a simplified block diagram of the control system of the arrangement of FIG. 8. Elements of FIG. 9 corresponding to those of FIG. 6 are designated by like reference numerals. In FIG. 9, motion of the pin tool caused by movement of motor 450 is coupled to LVDT 710, which produces a signal representing pin tool position relative to the surface. The position signals are applied to an encoder 912, which may be as simple as a differentiator, for determining the rate of change of position. The rate of change of position signal is applied to a modulator or multiplier 910, which couples more or less of the pressure error signal from error detector 612 to the motor, depending upon the rate of change signal. The purpose of this arrangement is to prevent application of excessive force to the pin tool during initial penetration, which might damage the system.

Other embodiments of the invention will be apparent to those skilled in the art. For example, while a general-purpose computer processor has been described as controlling the feedback, a dedicated processor could also be used, and might even be advantageous, by virtue of simplicity and reliability. While the term "motor" has been used to describe a transducer from electricity to mechanical energy, other devices than a conventional rotary motor may be used, as for example piezoelectric or magnetic devices, or linear motors. While the feedback loops have shown simple feedback schemes, but many types of feedback control may be used, including proportional-integral-derivative (PID) control.

Thus, a method according to an aspect of the invention for stir-friction hot-working or welding a planar workpiece (14) uses a rotating pin tool (22) which includes a pin or ligament defining a diameter at locations closer to the tip of the pin tool (22) than at a particular location along its length, and also including or defining a shoulder (224) at the location. The shoulder (224) has a larger diameter (D) than the pin diameter (d). The method includes the steps of rotating the tool, and applying pressure or force to the pin tool (22) with the pin tool (22) plunged into one side (14us) of the workpiece (14), and with at least a portion (524l) of the shoulder (224) essentially coincident with the surface (14us) of the one side of the workpiece (14), so that the rotating pin creates a friction-stirred region. According to an aspect of a method according to the invention, the workpiece (14) and the rotating tool (22) are moved laterally (in a direction orthogonal to the axis of rotation) relative to each other (by motor 470, rack 472 and gear 474), so that the friction-stirred region (14b) progresses along the workpiece (14). During the moving step, a signal is generated, which is representative of the pressure or force applied to the pin tool (22). A reference signal is generated (block 610) which is representative of that force (B) which is sufficient to maintain the shoulder (224) against the one surface (14us) of the workpiece (14). The signal representative of the force applied to the pin tool (22) is compared (in error signal generator 612) with the reference signal, for generating an error signal representative of the difference between the force applied to the pin tool (22) and the force represented by the reference signal. The error signal is used to control the step of applying force in a manner tending to maintain the shoulder (224) in contact with, or essentially coplanar with, the one surface of the workpiece (14), as a result of which, or whereby, the pin maintains substantially constant plunge depth.

In a particularly advantageous mode of practicing a method according to the invention, the step of applying force includes the steps of coupling a lead screw (430) to the pin tool (22) and to a fixed reference point (410), so that rotation of the lead screw (430) applies pressure or force to the pin tool (22). The shaft of a force or lead-screw motor (450) is coupled (by gear 451) to the lead screw (430), for rotating the lead screw (430) in response to rotation of the force or lead-screw motor (450), as a result of which, or whereby, the pressure or force applied to the pin tool (22) is responsive to the rotational position of the force motor (450) shaft (450s). The shaft (450s) of the force motor (450) is rotated in response to at least the magnitude of the error signal (generated by error signal generator 612), and preferably in opposite rotational directions in response to the variation of the error signal relative to a particular value of the error signal, which is preferably a zero value. In a most preferred embodiment of the invention, the maximum pressure or force which can be applied to the pin tool (22) is limited.

The method according to the invention may further include initial steps which cause the pin tool (22) to plunge into the workpiece (14). These steps include positioning the tip of the pin tool (22) adjacent the one surface of the workpiece (14), and generating a signal representing the plunge of the pin tool (22) relative to the one surface of the workpiece (14). Other steps include generating a monotonically changing signal which represents a profile of the desired depth of plunge as a function of time, generating a difference signal representing the difference between the actual plunge of the pin tool (22) and the desired depth of plunge, rotating the pin tool (22), and controlling the force in response to the difference signal in such a manner that the force increases when the actual plunge is less than the desired plunge, and decreases when the actual plunge is more than the desired plunge. The step of moving the workpiece (14) and the rotating tool laterally relative to each other begins when the actual plunge equals the desired plunge.

What is claimed is:

1. A method for stir-friction welding a planar workpiece, using a rotating pin tool including a pin defining a diameter at a particular location along its length, said pin tool further including a shoulder at said location, said shoulder having a larger diameter than said pin, said method comprising the steps of:

rotating said tool;

applying force to said pin tool, with said pin tool plunged into one side of said workpiece, and with said shoulder essentially coincident with the surface of said one side of said workpiece, so that the rotating pin creates a friction-stirred region;

moving said workpiece and said rotating tool laterally relative to each other, so that said friction-stirred region progresses along said workpiece;

during said moving step, generating a signal representative of the force applied to said pin tool;

generating a reference signal representative of that force which is sufficient to maintain said shoulder against said one surface of said workpiece;

comparing said signal representative of the force applied to said pin tool with said reference signal, for generating an error signal representative of the difference between said force applied to said pin tool and said reference signal;

using said error signal to control said step of applying force in a manner tending to maintain said shoulder in contact with said one surface of said workpiece, whereby said pin maintains substantially constant plunge depth; and limiting the magnitude of said error signal.

2. A method for stir-friction welding a planar workpiece, using a rotating pin tool including a pin defining a diameter at a particular location along its length, said pin tool further including a shoulder at said location, said shoulder having a larger diameter than said pin, said method comprising the steps of:

rotating said tool;

applying force to said pin tool, with said pin tool plunged into one side of said workpiece, and with said shoulder essentially coincident with the surface of said one side of said workpiece, so that the rotating pin creates a friction-stirred region;

moving said workpiece and said rotating tool laterally relative to each other, so that said friction-stirred region progresses along said workpiece;

during said moving step, generating a signal representative of the force applied to said pin tool;

generating a reference signal representative of that force which is sufficient to maintain said shoulder against said one surface of said workpiece;

comparing said signal representative of the force applied to said pin tool with said reference signal, for generating an error signal representative of the difference between said force applied to said pin tool and said reference signal;

using said error signal to control said step of applying force in a manner tending to maintain said shoulder in contact with said one surface of said workpiece, whereby said pin maintains substantially constant plunge depth; and further comprising the initial steps of:

positioning a tip of said pin tool adjacent said one surface of said workpiece;

generating a signal representing the plunge of said pin tool relative to said one surface of said workpiece;

generating a monotonically changing signal which represents a profile of a desired depth of plunge as a function of time;

generating a difference signal representing the difference between the actual plunge of said pin tool and said desired depth of plunge;

rotating said pin tool; and controlling said force in response to said difference signal in such a manner that said force increases when said actual plunge is less than the desired plunge, and decreases when said actual plunge is more than said desired plunge.

3. A method according to claim 2, wherein the magnitude of said force is limited to a maximum value during said plunge.

4. A method according to claim 2, wherein said step of moving said workpiece and said rotating tool laterally relative to each other begins when said actual plunge equals said desired plunge.

* * * * *